United States Patent [19]
Inkinen

[11] Patent Number: 5,809,115
[45] Date of Patent: Sep. 15, 1998

[54] TERMINAL TO BE COUPLED TO A TELECOMMUNICATIONS NETWORK USING RADIO COMMUNICATION

[75] Inventor: Sami Inkinen, Tampere, Finland

[73] Assignee: Nokia Mobile Phones Ltd., Salo, Finland

[21] Appl. No.: 775,812

[22] Filed: Dec. 31, 1996

[30] Foreign Application Priority Data

Jan. 3, 1996 [FI] Finland ..................................... 960023

[51] Int. Cl.[6] .................................................. H04M 11/00
[52] U.S. Cl. ........................................ 379/93.05; 455/557
[58] Field of Search .................. 379/90.01, 93.05–93.08, 379/93.14, 93.37, 110.01; 455/556–559, 575, 343, 344

[56] References Cited

U.S. PATENT DOCUMENTS

| | | | |
|---|---|---|---|
| 5,302,947 | 4/1994 | Fuller et al. | 364/705.05 |
| 5,566,226 | 10/1996 | Mizoguchi et al. | 455/558 |
| 5,579,489 | 11/1996 | Dornier et al. | 455/575 |

FOREIGN PATENT DOCUMENTS 2285558  12/1995  United Kingdom .

*Primary Examiner*—Wing F. Chan
*Attorney, Agent, or Firm*—Perman & Green, LLP

[57] ABSTRACT

The present invention relates to a terminal to be coupled to a telecommunications network using radio communication, which consists of a computer (100) and a radio module (200) to be coupled thereto. The radio module is connected to the computer using a digital bus coupling, for example a PCM-CIA bus. This terminal can be connected to a telecommunications network using radio communication, for example, the GSM system. It is essential to the invention that the operations required in the transmission and reception of a message and their performance have been divided between the computer and the radio module. Two alternative embodiments are presented. In the first embodiment, the radio module contains ancillary processors (213, 214) to achieve a sufficient calculation capacity; in the second embodiment, the computer's processor (110) performs the main part of the required processing. The necessary radio frequency elements (230) are located in the radio module.

15 Claims, 5 Drawing Sheets

TERMINAL TO BE COUPLED TO A TELECOMMUNICATIONS NETWORK USING RADIO COMMUNICATION

FIELD OF THE INVENTION

The present invention relates to a terminal, comprising a computer, and a radio module to be coupled thereto for transmitting and receiving messages by a computer using radio communication. The radio module comprises a transmitter for transmitting messages and a receiver for receiving messages. The computer and the radio module comprise means for performing operations related to the transmission and reception of data.

BACKGROUND OF THE INVENTION

In the modern information society, people are more and more dependent on the telecommunications networks and the services thereby provided. The utilisation of telecommunications networks has grown in importance and individuals no longer want to be dependent on the limitations-of a traditional wire network. Therefore a large number of people today have a wireless mobile station, for example a GSM mobile phone, which is most commonly used for normal telephone communication.

People have also become more and more dependent on other available telecommunication services, such as faxes, e-mail, Internet and file transfer services. When one has become accustomed to these services in traditional office surroundings, it is difficult not to have access to them, for example, when going on a business trip. Modern technology offers a solution: a GSM mobile phone may be provided with accessories by which a portable computer may be coupled, using radio communication, to the telecommunications network and, through the network, to all the same services that are available via a wired network.

The most typical method currently used to interconnect a computer and a mobile station is called the PCMCIA (Personal Computer Memory Card International Association) bus. Initially, the PCMCIA bus was designed to couple an additional memory card to a computer (version 1.0 in 1990), but very soon, the version 2.0 became common, which contained the possibility to also connect to a computer external I/O (Input/Output) devices, such as modems, wired and wireless LAN (Local Area Network) network cards, as well as mobile stations. Today, there are systems available on the market in which the mobile station is connected to the PCMCIA bus by an adapter cable.

The PCMCIA bus has become more and more commonly used in particular in portable computers; it is possible to make a coupling to a PCMCIA bus with a narrow 68 pin connector. To the connector a PC card can be coupled. The PC card is the size of a credit card except for thickness, which is 3.3 mm (type I), 5.0 mm (type II), or 10.5 mm (type III). PC card is a commonly used name. A so-called Enhanced PC Card can also be coupled to a PCMCIA bus. An Enhanced PC card is the same size as PC cards of the types I–III except that it is 50 mm longer. This enables a more simple mounting of external components, such as connectors and antennas, directly to a PC card. The generic term PC card will be also used later to designate an Enhanced PC Card.

The growth of integration density in integrated circuits and the development of manufacturing methods has made possible technology in which a considerable amount of electronics has been integrated into a PC card. In systems currently used, even the electronics of a mobile station, for example of a GSM phone, can be compressed into one PC card. A portable computer and a mobile station module (PC card), to be connected to a PCMCIA card slot, then form a compact entity. With the help of said equipment, a user may wirelessly utilise the services of telecommunications networks. A solution is presented in patent publication EP 629 071 where a mobile phone, into which a modem is integrated, is connected to a computer's data port. Similar solutions are also known from patent publications WO 94/21058, WO 94/26038, and WO 94/29968. These differ from the solution in the EP publication chiefly as to the user interface, since instead of the mobile station's keyboard and display, a computer is used as the user interface.

However, the solutions presented above have drawbacks. A mobile station module located in the PCMCIA card slot, which contains most components of a typical mobile station, requires a considerable amount of power. If an external power source has to be used because of an electricity requirement, the benefits of easy management aimed at in the first place will be lost. In addition, the radio module, as described with numerous components, is difficult and expensive to implement with the size of a PC card.

Now, a method and equipment have been invented to eliminate, or at least minimise, the problems described above.

SUMMARY OF THE INVENTION

Modern computers contain at least one efficient processor whose calculation power can be utilised when a computer is connected by using radio communication to a telecommunications network. According to the invention, part of the procedures related to the transmission and reception of a message is carried out in a computer and part is carried out in a radio module to be connected to the computer. Therefore, the radio module according to the invention cannot be used per se as a traditional mobile station since part of the processing is carried out preferably in the computer's processor. Together with the functions performed by the computer, the radio module performs the functions of a mobile station. Since part of the processing normally performed by a mobile station is done in the computer by using the computer's processor, blocks can be omitted in the radio module and thereby components also, which makes the implementation of the radio module more simple in comparison with an ordinary mobile station. The architecture of the invention does not in any way restrict the use of the invention for use only as a traditional mobile station (speech, data and fax services), but the architecture can also be applied to make use of multimedia and video services.

The invention is characterized in that the computer comprises means to perform part of the operations related to the transmission and reception of a message, and the radio module comprises means for performing other part of the operations related to the transmission and reception of a message.

The method is characterized in that the computer performs part of the operations related to the transmission and reception of a message and the radio module performs the other part of the operations related to the transmission and reception of a message.

In the first embodiment of the present invention, the processing of a radio frequency signal, which relates to the transmission and reception of a message, and part of the processing of a baseband signal are performed in the radio module, while the rest of the processing of a baseband signal is performed in the computer. This is implemented so that the processing required by a mobile station is divided between the computer's processor and one or more ancillary processors placed in the radio module. Ancillary processors are used to ensure that the processing power of the system is sufficient to perform all the processing tasks required by a mobile station, which are partly time critical, even if the computer's processor was used for the simultaneous running of other programmes. In this first embodiment, the computer's processor performs, among other things, the maintenance of a user interface, source coding and control of the entire system, while the tasks of the radio module include mobility management, allocation of radio frequencies, call control, channel coding, block coding, interleaving, and ciphering. In the first embodiment of the present invention, as in other embodiments, the radio module also contains radio frequency elements with receiver and transmitter in order to make a wireless coupling to a telecommunications network.

In the idle mode, when a terminal and a base station do not transmit between themselves any information other than that essential in maintaining communication between the terminal and the base station, there is a considerably smaller need of processing capacity than in the call mode. Since the operations related to the transmission and reception of a message are, in the first embodiment of the invention, divided between the computer and the radio module preferably so that the functions required in a call mode are performed in the computer and the functions required in an idle mode are performed in the radio module, and since the radio module alone contains sufficient processing capacity to perform the routines in idle mode, in order to increase the operational time of the system, the computer and its processor can be run, during idle mode, in a power save mode. When moving from idle mode to call mode, the power save mode is terminated, and the computer's processor is activated; then the computer's processor assumes the control of call mode and performs its routines.

In order to maintain and control the entire system, for example the allocation of resources between the computer and the radio module's processor, and to perform the transfer from idle mode to call mode as efficiently as possible, the memory blocks contained in the radio module are handled directly by the computer's processor. For example, the programme codes of the radio module's ancillary processors may be changed under the control of the computer's processor. This enables the control and direction of the system during contact in real time, also.

In the second embodiment of the present invention, primarily, the processing of a radio frequency signal, related to the transmission and reception of a message, is performed in the radio module, and the processing of a baseband signal, related to the transmission and reception of a message, is performed in the computer. In this case, the radio module does not preferably contain ancillary processors. The radio module comprises mainly the radio frequency elements with receiver and transmitter, other processing takes place in the computer's processor. In the computer, there may be several processors to achieve sufficient calculation capacity. The second embodiment of the present invention further reduces the number of components needed in the radio module and, thereby, a more compact size and lower manufacturing costs are achieved.

DETAILED DESCRIPTION

Figure 1:
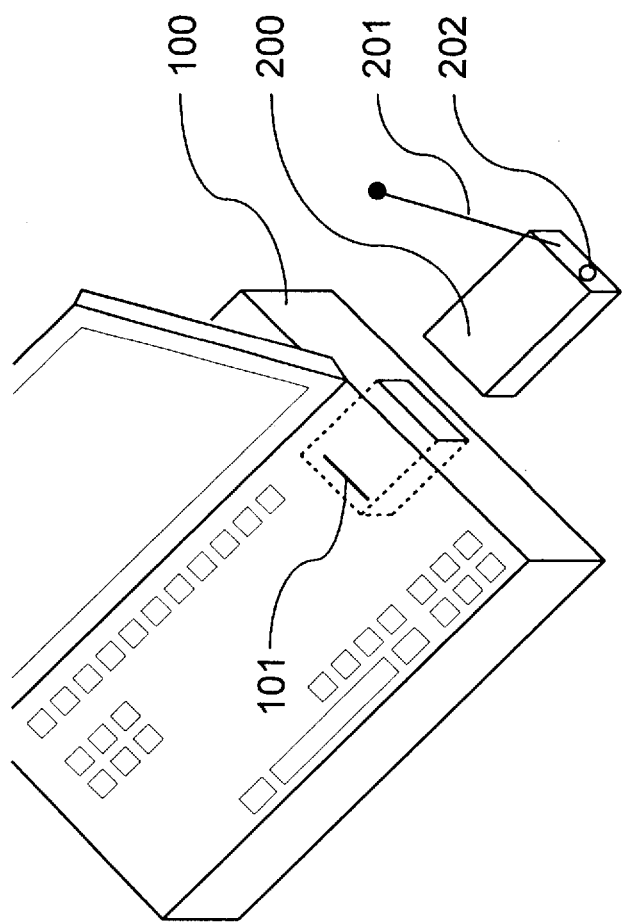
FIG. 1 shows elements of the terminal according to the present invention.

FIG. 1 shows an example of the mechanical structure of the invention. A terminal according to the invention comprises a computer 100, a radio module 200 to be coupled to the computer and an antenna 201 to be coupled to the radio module. The radio module 200 is preferably mounted inside the computer 100, but in the event there is no appropriate mounting location for the radio module inside the computer, the radio module can also be located outside the computer. The radio module 200 and the computer 100 are interconnected via connector 101. An external antenna 201 can be connected to radio module 200 either directly or by using a connection cable. A connection cable is practical when used, for example, in a car. An additional amplifier may also be used in order to raise transmission power. If an additional amplifier is used, an additional power source may be coupled, if necessary, to the connector 202.

Figure 2:
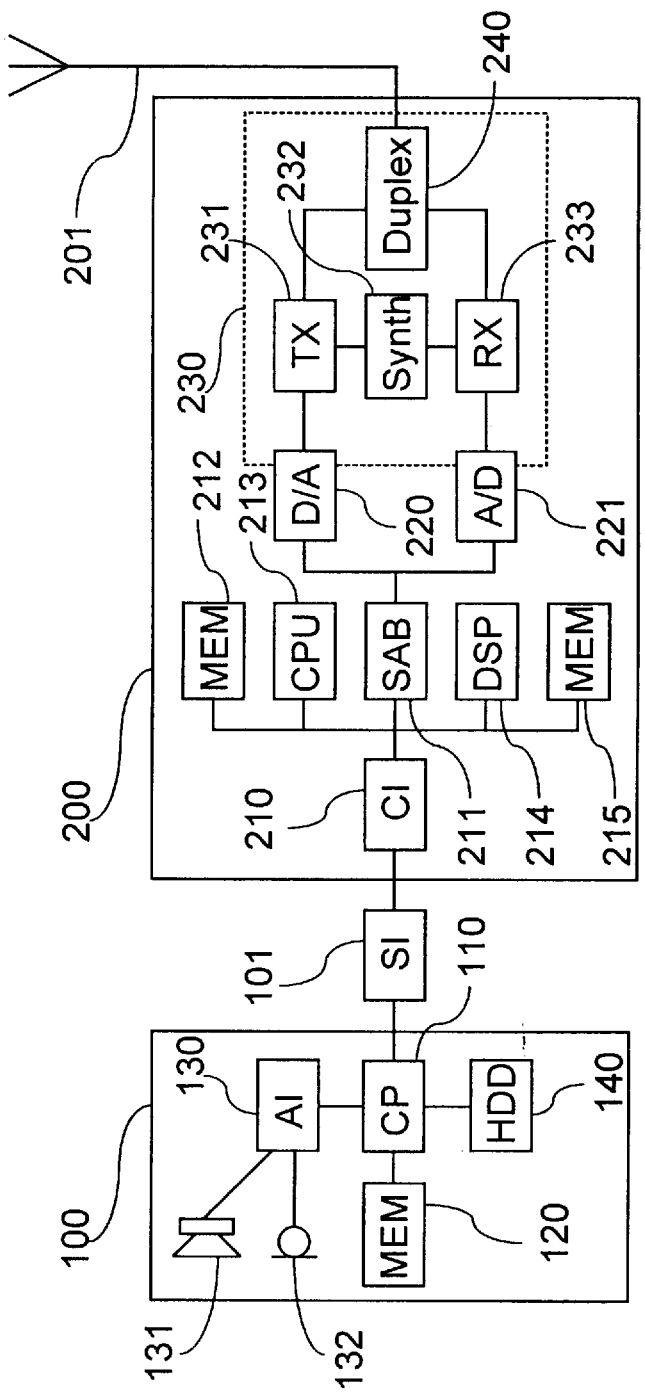
FIG. 2 shows a block diagram of the structure of the first embodiment of the present invention.

FIG. 2 shows a block diagram of the structure of the first embodiment of the present invention. According to the invention, part of the operations carried out in connection with the transmission and reception of a message is performed in the computer 100, while part of the operations is performed in the radio module 200; particularly in the first embodiment of the present invention, the processing of a radio frequency signal related to the transmission and reception of a message and part of the processing of a baseband signal are performed in the radio module 200; the other part of the processing of a baseband signal is performed in the computer 100.

The available calculation resources of a computer depend on, among other things, the performance of the computer's processor (or processors), the computer's operating system and on other programme routines, which are to be performed simultaneously. Because part of the processing required by a typical mobile station, such as a GSM mobile phone, is time critical, it cannot be guaranteed that the free calculation capacity of a computer is alone sufficient for all systems to perform the required routines. In order for the calculation capacity to suffice, it is possible to place one or more ancillary processors in the radio module. In this first embodiment according to the present invention, two ancillary processors, one of which is a digital signal processor, are placed in the radio module.

In FIG. 2, the computer 100 comprises a processor 110, a memory 120, an audio interface block 130, and a mass storage 140. A loudspeaker 131 and a microphone 132 are coupled to the audio interface block. The loudspeaker and the microphone can be either integrated inside the computer 100 or they can be separate external devices. The radio module 200 comprises a card interface 210, a system ASIC block 211, an ancillary processor 213, an ancillary processor's memory 212, a digital signal processor 214, a signal processor's memory 215, a D/A converter 220, an A/D converter 221, and a radio frequency element 230. The radio frequency element 230 comprises radio frequency elements typical of a mobile station required to connect the system using radio communicatin to a telecommunications network. These include a transmitter block 231, a synthesizer 232, a receiver block 233, and a duplex filter block 240. The computer 100 and radio module 200 are interconnected via connector 101. The connection may be, for instance, a mechanical connector as is the case with the PCMCIA bus, but this does not exclude the use of optical connection or connection using radio communication in a terminal according to the present invention.

A terminal according to the present invention is activated by starting a programme, in the operating system of the computer 100, whose main task is to maintain the user interface of the terminal and to control the function of the entire system. If this is a Microsoft Windows based operating system, the programme is started, for example, by double-clicking a mouse button. The programme may also be started automatically when the computer is switched on. This may be carried out by entering a command line to start the programme in the AUTOEXEC.BAT file (DOS operating system), which is located in the home directory of the hard disc. To start the programme, there are also other methods known to a person skilled in the art; the method or operating system used to start the programme does not interfere with the operational idea of the terminal. Directed by the computer's processor 110, the programme, which is started to make the entire system operational, formats the radio module 200 into an operating mode by loading programmes into the ancillary processor 213 and the signal processor 214 from the computer's memory 120, the mass storage 140 or the programme memories 212 and 215 of the radio module 200, into which a programme code/programme codes are preset, for example, during the installation of the programme of the terminal.

In order to use the terminal according to the present invention, it is important that data transfer between the user and the computer occur in as uncomplicated a way as possible. This can be accomplished with the help of a so-called user interface, which comprises, among others, a display, a keyboard and a programme window displayed on the screen. Typically, the programme window is specialised; for example, a programme window according to the present invention is the very part of the user interface via which a user may make calls and receive messages using radio communication. The user interface is activated, i.e., it is displayed on the screen, and it is capable of transmitting data between the user and the terminal, directed by the programme of terminal 110.

After loading the programmes into the ancillary processor 213 and the signal processor 214 as required by idle mode and on activating the user interface, the computer's processor 110 sets the user interface in idle mode. In the idle mode, the user interface waits for either a command from the user, such as a command to execute an outgoing call, or a message from the radio module 200, such as to receive an incoming call. The setting into idle mode is important in order for the potential power save system of the computer's operating system to function normally. The functions of idle mode, call mode and power save system are described in detail in the explanations for FIGS. 4 and 5.

A graphical user interface enables the use of sound, data, fax, and image call services with a mouse or an equivalent control unit. The desired services may be started, for example, by clicking on the right selections on the screen or by selecting the desired activity from the menus. These are typical examples of functions, controlled by the user, which are not particularly time critical. In this context, time critical refers to an operation to be executed within a required period of time irrespective of the user. These non-time critical operations are only part of the tasks that belong to the domain of the computer's processor 110.

In the preceding paragraphs, the emphasis was on the user interface and its embodiment. In typical modern user interface applications, the operating system accounts for a large part of the functions required to maintain a user interface. For example, in user interface applications run under the Microsoft Windows operating system, a user interface application programme does not have to control the mouse-based cursor movements or movements of windows on the screen. A user interface application programme can therefore concentrate on providing the functions that are essential for the user. These functions include, in addition to the generation and support of a visible user interface, control of the terminal according to the present invention as an entity, so that it can successfully be connected using radio communication to the telecommunications network.

In addition to the maintenance of the user interface, in the terminal according to the present invention, the processor 110 of the computer 100 monitors the entire system by also controlling the function of the radio module 200. These functions include the loading of programmes into the memory 212 of the ancillary processor 212 located in the radio module 200 and into the memory 215 of the signal processor 214 by situational requirements, for example when transferring from idle mode to call mode and vice-versa. In the terminal according to the present invention, the implementation and control of the operational blocks of the first embodiment of the present invention are explained in more detail in connection with FIGS. 4 and 5, whereas FIG. 2 concentrates on describing the mechanical structure of the terminal.

In the radio module 200 in FIG. 2, the required internal processing capacity is achieved by using one or more processors, for example processors or digital signal processors previouly known from computers. Processing capacity is needed for, among other things, maintaining communication between a mobile station and a base station and for modifying the baseband signal to make it suitable for transfer using radio communication. In the first embodiment of the present invention, processing capacity is available both from the ancillary processor 213 and the signal processor 214. In the first embodiment of the present invention, tasks requiring processing capacity are divided between the ancillary processor 213 and the signal processor 214, so that the ancillary processor 213 performs mainly the tasks that are essential for communication between a mobile station and a base station and that require diversified processing, such as mobility management (change of base station, for example), radio frequency management (transmission and reception frequencies), and call control (processing of outgoing and incoming calls). Similarly, the signal processor 214 in the radio module 200 performs tasks requiring real time processing of an outgoing and incoming signal, such as channel coding, block coding, interleaving and de-interleaving, and ciphering and de-ciphering. Mobility management, radio resource management, call control, channel coding, block coding, interleaving, de-interleaving, ciphering and de-ciphering, are known to a person skilled in the art, for example from a GSM mobile station. These operational blocks, like other blocks in a typical GSM mobile station, are presented in "The GSM System for Mobile Communications" 1992 by Bernadette Paulin (ISBN 2-9507190-0-7).

The ancillary processor 213 of the radio module 200, the signal processor 214 and the system's ASIC block 211 are coupled in the first embodiment of the present invention to the PCMCIA bus by using the card interface 210, which contains, among other things, the Card Information Structure (C.I.S.) contained in the information structure of the PC card. The CIS information is defined in the PCMCIA structure. The system's ASIC block 211 is responsible for the digital connection of the signal to be transmitted and received. It contains, among other things, buffer memories to transmit digital data in both directions and to handle the digital modulation of data. ASIC refers to an Application Specific Integrated Circuit, which is manufactured according to the customer's requirements in an integrated circuit factory. The ASIC block controls the synthesizer, the necessary clock pulses and directs current feed. The ASIC block 211 connects by the D/A (Digital-to-Analog) converter 220 and the A/D (Analog-to-Digital) converter 221 to the radio frequency element 230. The radio frequency element 230 contains the transmitter block 231 for sending a message to a base station; the receiver block 233 for receiving a message from a base station; the synthesizer 232 for generating necessary frequencies and the duplex filter 240 for separating transmission and reception signals. The function of the blocks of the radio frequency element 230 is known to a person skilled in the art from an ordinary mobile station.

Figure 3:
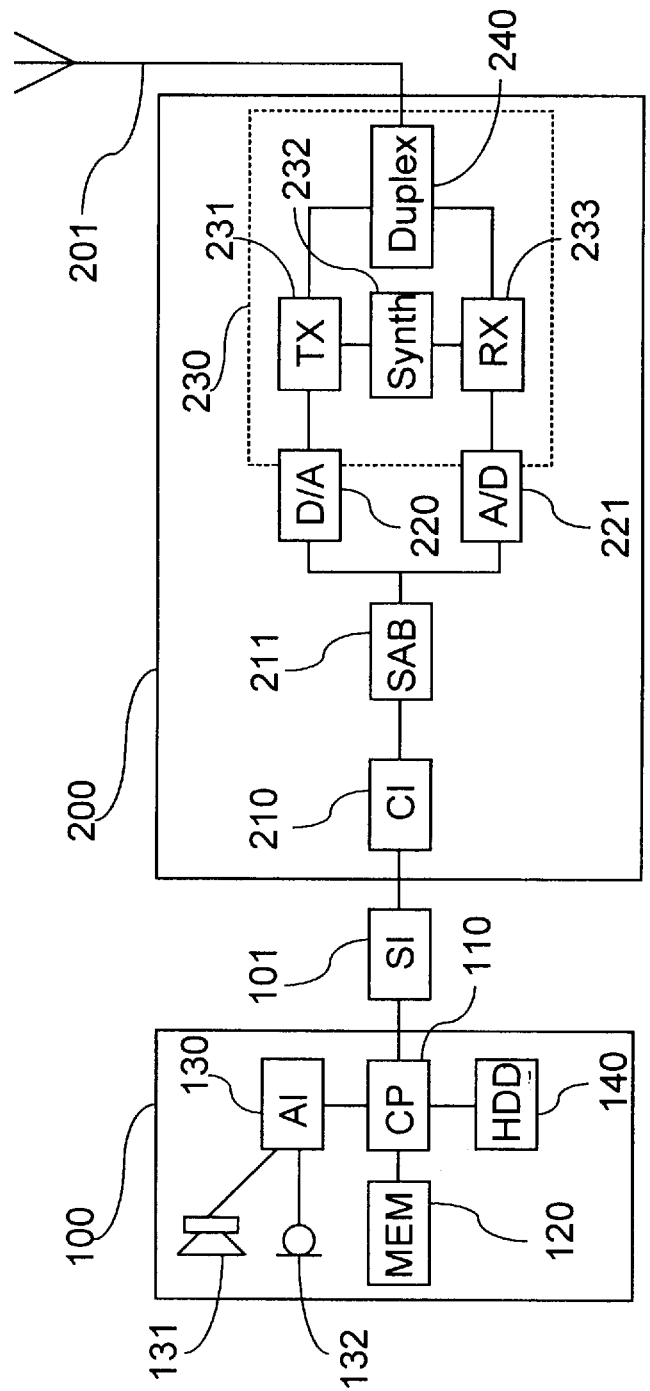
FIG. 3 shows a block diagram of the structure of the second embodiment of the present invention.

In FIG. 3, a block diagram shows the structure according to the second embodiment of the present invention. According to the invention, part of the tasks in connection with transmission and reception of a message is performed in the computer 100 and part in the radio module 200; particularly in the second embodiment of the invention, the radio module performs mainly the processing of a radio frequency signal that is related to transmission and reception of a message; the computer performs the processing of a baseband signal that is related to transmission and reception of a message. The computer 100 comprises a processor 110, a memory 120, an audio interface block 130, and a mass storage 140. A loudspeaker 131 and a microphone 132 are coupled to the audio interface block. The loudspeaker and microphone may be integrated either inside the computer 100 or they can be separate devices outside the computer. The radio module 200 comprises a card interface 210, a system ASIC block 211, a D/A converter 220, an A/D converter 221, and a radio frequency element 230. The radio frequency element 230 comprises radio frequency elements typical of a mobile station in order to connect the system using radio communication to a telecommunications network as shown in FIG. 2. The computer 100 and the radio module 200 are interconnected via a connector 101.

In the second embodiment of the present invention, the processor 110 of the computer 100 has more functions to perform than in the first embodiment of the invention, but as regards the structure of the radio module, a significant advantage has been achieved. The radio module 200 does not in this second embodiment preferably contain ancillary processors, but-instead, all functions characteristic of a typical mobile station, except for the processing of a radio frequency signal in the radio frequency element, are performed using the computer's processor 110. Thus, the realisation of a radio module in a more compact form is possible and preferably with lower manufacturing costs. The tasks of the computer's processor 110 include the maintenance of the user interface, overall control of the system, processing of speech and data during a call, mobility management, radio frequency management, call control, channel coding, block coding, interleaving and de-interleaving, ciphering and de-ciphering. Mobility management, radio resource management, call control, channel coding, block coding, interleaving, de-interleaving, ciphering and de-ciphering are functional blocks known to a person skilled in the art from a typical GSM mobile station. The coupling of the system's ASIC block to the PCMCIA bus by card interface 210 and the connection by A/D and D/A converters to the radio frequency block do not deviate from the principles of the first embodiment of the present invention.

Figure 4:
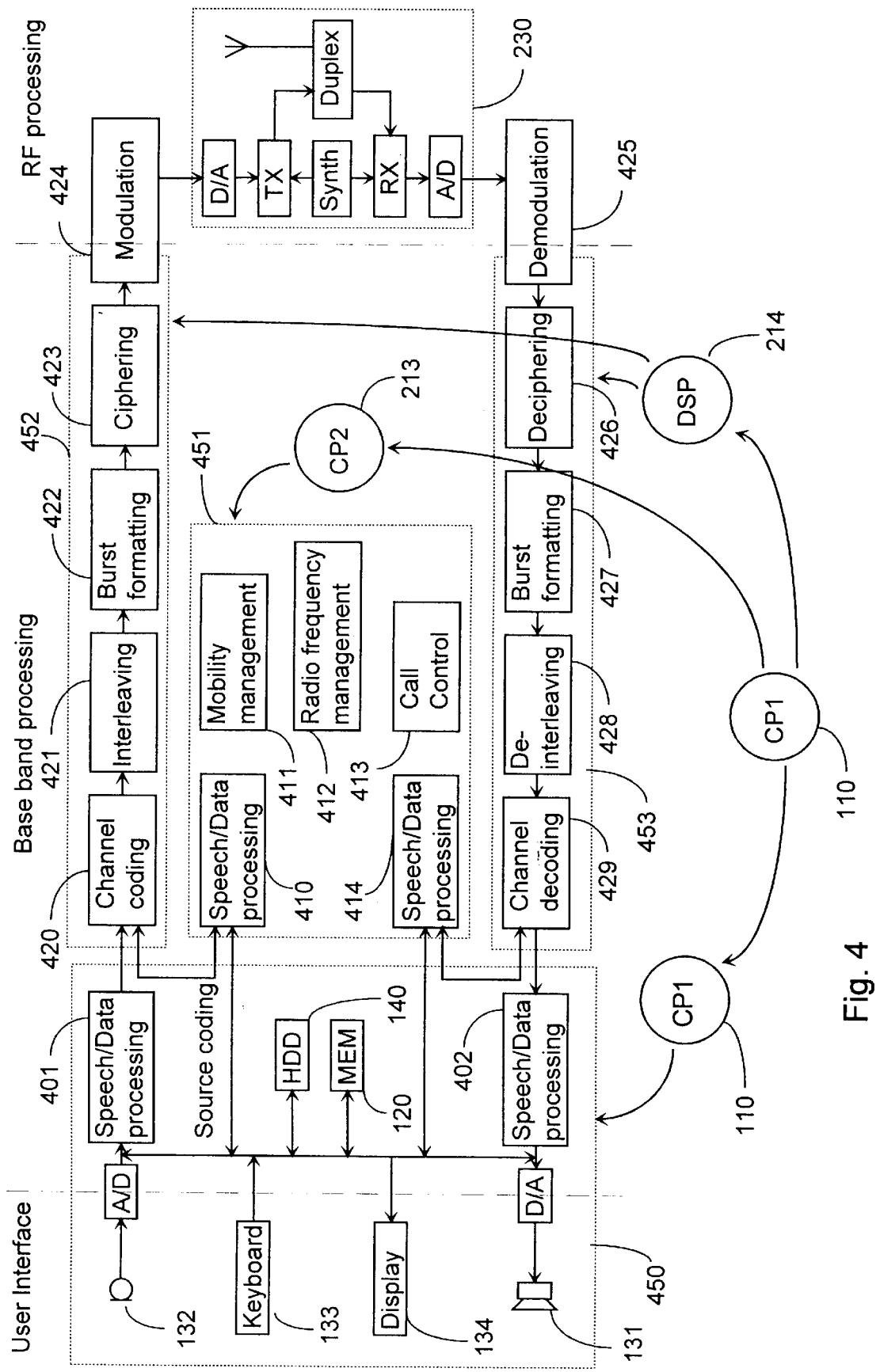
FIG. 4 shows a block diagram of the functional blocks of the first embodiment of the present invention and the allocation of tasks in call mode.
Figure 5:
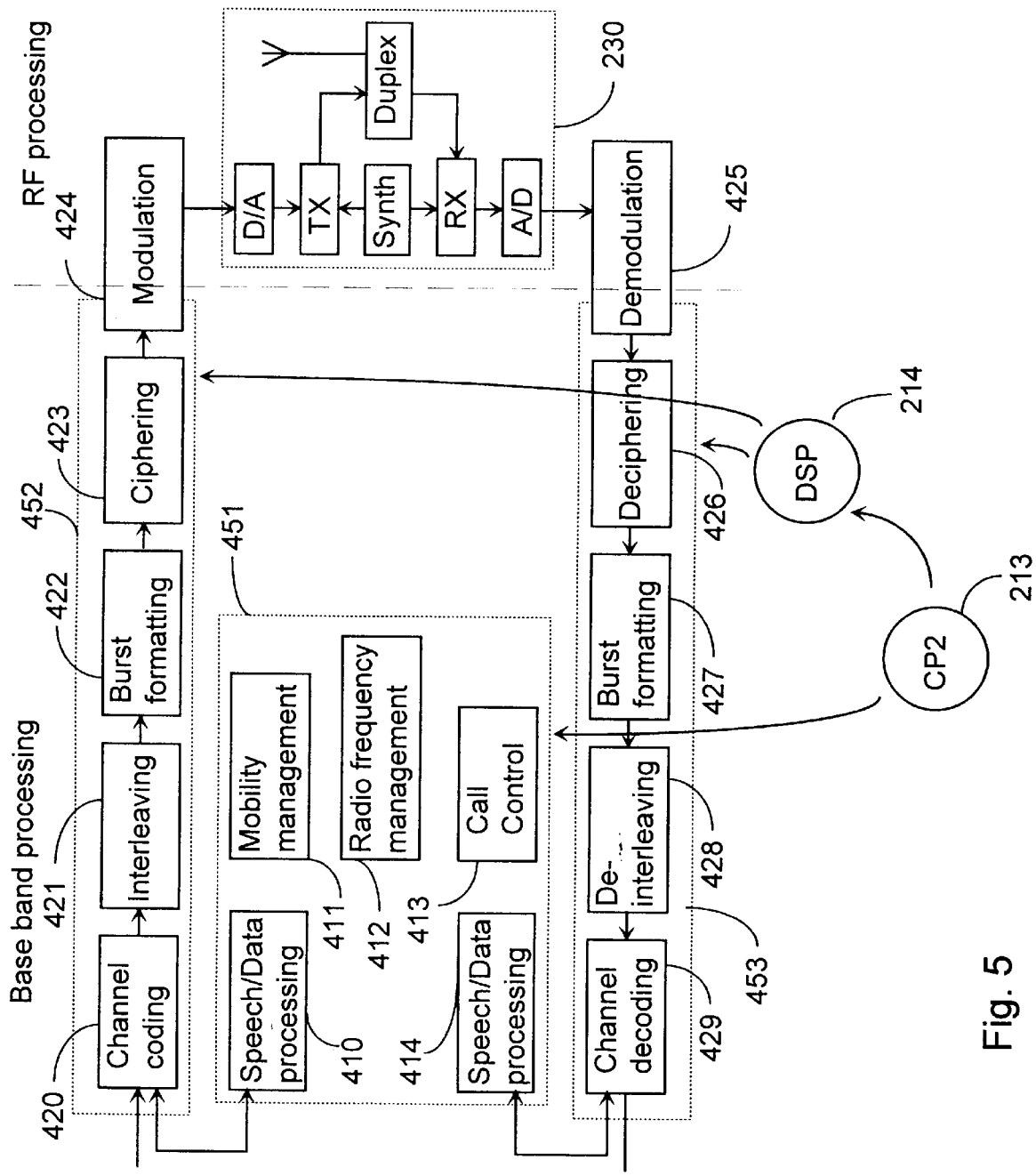
FIG. 5 shows a block diagram of the functional blocks of the first embodiment of the present invention and the allocation of tasks in idle mode.

In FIGS. 4 and 5, the division of functions among different processors is shown according to the first embodiment of the invention and the principle of overall control of the system both in call mode and idle mode. In FIGS. 4 and 5, blocks already known from FIGS. 1 to 3 are shown with reference numbers that are the same for the sake of simplicity.

In FIG. 4, a block diagram shows the division of functions among different processors according to the first embodiment of the invention and the principle of overall control of the system in call mode, in other words when the call and/or data channel is open between the terminal and the base station. FIG. 4 comprises five blocks. Block 450 comprises the functions that are performed by the programme run in the computer's processor 110. These include the maintenance of the user interface, in other words the control of the keyboard 133, the display 134, the microphone 132, and the loudspeaker 131, as well as the processing of speech and data in blocks 401 and 402, if necessary. In addition, the control of memory 120 and hard disc 140 is performed by the computer's processor 110. The processing of speech and data plays a central role in the operation of the terminal according to the invention, the processing of speech and data are discussed at a later point in a separate chapter.

Block 451 comprises the functions that are performed by the ancillary processor 213 mounted in the radio module (block 200 in FIGS. 1 to 3). These include the processing of speech and data in blocks 410 and 414, mobility management (411), radio frequency management (412), and call control (413). Blocks 452 and 453 contain the functions that are performed by digital signal processor 213 mounted in the radio module (block 200 in FIGS. 1 to 3). Block 452 comprises the functions occurring in the direction of transmission, such as channel coding 420, interleaving 421, burst formatting 422, and ciphering 423. Similarly, block 453 comprises functions in the direction of reception, such as de-ciphering 426, burst formatting 427, de-interleaving 428, and channel de-coding 429. The radio frequency module 230 contains the same blocks, already known, as in FIGS. 2 and 3.

In the call mode, i.e. when the speech and/or data channel is open between the terminal and the base station, there are several alternatives for speech and data source coding. It is possible to use the computer's processor 110 for processing both the speech and data signal, where necessary, and also simultaneously. Processing here refers to the modification of both speech and data signals in digital form to make them transferable via radio communication. The following is given as an example: the coding of speech by using the RPE-LTP (Regular Pulse Excitation-Long Term Prediction) method known from the GSM system where the post-A/D converter data flow, originally 64 kbit/s, is compressed into a 13 kbit/s data speed appropriate for radio communication. By using another, the so-called half-speed speech coding made possible by the GSM standard, it is possible to transmit in the same physical channel both speech and data simultaneously. Several different combinations are formed when, according to the first embodiment of the invention, the processing of speech and data can be performed either by the computer's processor 110, the ancillary processor 213 of the radio module, or the signal processor 214. A typical combination is achieved, for example, by performing speech coding in the processor 110 of the computer 100 and data processing in the ancillary processor 213 of the radio module 200, in which case both speech and data channels can be transmitted in one normal GSM call channel. Because the capacity of the ancillary processor 213 and the signal processor 214 mounted in the radio module can also be utilised in the processing of both speech and data signals, the procedure described above can also be realised, so that the computer's processor 110 performs data processing and the ancillary processor 214 of the radio module performs speech coding. If only speech or data is transmitted, the necessary coding may be freely selected in the processor of the computer 100 or the processors of the radio module.

If so desired, particularly during call the mode, it is possible to save speech, data and image information in the computer's memory 120 or mass storage 140 via the computer's processor 110. It is possible to further modify recorded data, and because the computer's processor 110 has a direct data connection to the System ASIC Block 211 of the radio module, to the ancillary processor 213 and to the signal processor 214, it is easy to accommodate an answering service in the programme, for example, by utilising mass storage 140 that already exists in the computer's processor.

The maintenance of the entire system in call mode is performed by the main programme, run in the computer's processor 110, that directs three subroutines. The first subroutine, which is performed by the same processor 110, is a subroutine operating the user interface or performing the source coding of speech or data. The second subroutine, performed in the radio module by the ancillary processor 213, maintains source coding 410 and 414 of speech or data, mobility management 411, radio frequency management 412, and call control 413. The third subroutine, performed by the digital signal processor, is the execution of routines contained in blocks 452 and 453. The operations described above are typical of call mode, but it is also possible to use the same hierarchy in the idle mode. This is not, however, the best alternative, since the computer's processor 110 is loaded despite the smaller procesing need in idle mode. This in turn may prevent the activation of automatic power save in the operating system of the computer. Therefore, the following is presented as a preferable method with whose help the computer's processor 110 does not have to be in control during idle mode, thereby enabling the use of advanced power saving methods.

Because operations related to the transmission and reception of a message are in the first embodiment of the invention preferably divided between the computer and the radio module, so that the operations needed in call mode are performed in the computer and the operations needed in the idle mode are performed in the radio module, it is possible to transfer, in idle mode, the overall responsibility of control of the system to the radio module, directed by the computer's processor 110. If the computer is only used for controlling the radio module (200 in FIGS. 2 and 3), and the telecommunication linkage between the terminal and the base station is only used for sending control data, the processor 110 of the computer 100 loads a new programme into the ancillary processor 213 and into the signal processor 214 to change the operational mode. After the code is loaded, the processor 110 transfers the responsibility for control and maintenance to the ancillary processor 213 of the radio module, which is now responsible for, among other things, the maintenance of radio connection between the terminal and the base station. After this operation is completed, the operating system of the computer 100 sets the processor 110 into the rest mode; depending on the operating system, the clock frequency of the processor is then reduced or stopped altogether. In order to intensify power save in the rest mode, the hard disc 140 can also be stopped.

In the event the user activates a computer in the rest mode, for example by touching the keyboard 133 or moving the mouse, the operating system of the computer activates the processor 110 and possibly switches on the hard disc in case it was switched off. This operation is dependent only on the operating system of the computer and does not cause changes in the controlling of the terminal; the control responsibility remains in the ancillary processor 213 of the radio module. This operation is not, therefore, essential from the point of the invention but affects the overall power consumption of the terminal. When the user wishes to make contact with a telecommunications network, the control responsibility for a terminal according to the invention is transferred from the ancillary processor 213 to the computer's processor 110 and to the programme executed there. In this case, the computer's processor 110 loads the programme codes required by the new operational situation into the processors of the radio module.

Another example of the controlling of the system during an operational situation and the transfer of control responsibility is a situation where transfer is made from the idle mode to call mode on account of an incoming call. In this case, the ancillary processor 213 of the radio module, that was responsible, activates the computer and its operating system by giving commands to the computer's processor 110. The control responsibility is then transferred to the computer's processor 110, which loads the programme codes required by the new operational situation into the processors of radio module 200, as is done when a user contacts the base station.

By arranging for enough memory capacity in radio module 200, in other words ensuring that the memories of the ancillary processor 212 and the signal processor 215 are sufficiently large, it is possible to load the programme codes of the ancillary processor 213 and the signal processor 214 needed in both idle mode and call mode into the memories simultaneously. In this case, the computer's processor 110 only needs to give a command to the radio module to transfer from idle mode to call mode or vice versa, or, in practise, the ancillary processor 213 of the radio block and the signal processor 214 execute programme code blocks from different memory addresses. It is also possible to combine into one programme package the programmes required by different operational modes and processors, in which case different operational modes are like subprogrammes of the same programme package. It is possible to place the programme package into one physical memory, where the memory 212 of the ancillary processor and the memory 215 of the signal processor are one and the same memory.

In FIG. 5, a block diagram shows the division of operations among different processors according to the first embodiment of the invention, as well as the principle of overall control of the system in the idle mode, in other words when the terminal and the base station do not transmit between themselves information other than what is necessary to maintain communication. FIG. 5 contains four blocks. Block 451 contains the operations that are also performed during idle mode by the ancillary processor 213, located in the radio module (block 200 in FIGS. 1 to 3). These include the coding of necessary data in blocks 410 and 414, mobility management (411), radio frequency management (412), and call control (413), where necessary. Blocks 452 and 453 contain the operations that are performed by digital signal processor 213, located in the radio module (block 200 in FIGS. 1 to 3). Block 452 comprises operations occurring in the direction of transmission, such as channel coding 420, interleaving 421, burst formatting 422, and ciphering 423. Similarly, block 453 comprises functions in the direction of reception, such as de-ciphering 426, burst formatting 427, de-interleaving 428, and channel de-coding 429. The radio frequency module 230 contains the same blocks, already known, as in FIGS. 2 and 3.

The ancillary processor 213, located in the radio module, is responsible for the maintenance of the entire system in idle mode. The computer's processor 110 and, therefore, the programme share maintaining the user interface are switched off. The ancillary processor 213 of the radio module also performs the functions contained in module 451, such as mobility management 411, radio frequency management 412 and call control 413. The ancillary processor 213 also controls the performance of routines in blocks 452 and 453, executed by the digital signal processor 214.

The paper presented a realisation of an invention and some embodiments with the help of examples. It is obvious to a person skilled in the art, that the present invention is not restricted to details of the embodiments presented above, and that the invention can also be realised in another form without deviating from the characteristics of the invention. The presented embodiments should be considered illustrative but not restricting. Thus the possibilities for realization and use of the invention are limited only by the enclosed claims. Consequently, the various options of realising the invention as determined by the claims, including the equivalent realisations, also belong to the scope of the invention.

I claim:

1. A method for coupling a terminal to a telecommunications network via radio communication, said terminal performing operations related to the transmission and reception of a message, said terminal comprising a computer and a radio module to be coupled thereto for transmitting and receiving messages, wherein the computer comprises circuitry suitable both for purposes of computing and for telecommunication, the method comprising steps of:

transmitting messages via a transmitter of said radio module, and receiving messages via a receiver of said radio module;

performing, by said computer, at least a part of the operations related to the transmission and the reception of a message, said operations comprising processing a baseband signal related to the transmission and the reception of the message;

performing, by said radio module, the other part of the operations related to the transmission and the reception of a message; and performing, by said radio module, processing of a radio frequency signal for the transmission and the reception of the message.

2. A terminal which comprises a computer and a radio module to be coupled thereto for transmitting and receiving a message by the computer using radio communication, said radio module comprising a transmitter for transmitting a message and a receiver for receiving a message, and said terminal comprising means for performing operations related to the transmission and reception of a message, wherein the computer comprises means for performing part of the operations related to the transmission and reception of a message, and the radio module comprises means for performing the other part of the operations related to the transmission and reception of a message;

wherein the computer comprises means for performing at least part of the processing of a baseband signal related to the transmission and reception of a message, and the radio module comprises means for performing processing of a radio frequency signal related to the transmission and reception of the message.

3. A terminal according to claim 1, wherein the computer comprises means for performing processing of a baseband signal related to the transmission and reception of a message, and the radio module comprises means for performing processing of a radio frequency signal.

4. A terminal according to claim 1, wherein the radio module comprises a memory for saving a program code monitoring the function of the radio module, and a processor of the computer has been arranged to control the function of the radio module by changing the program code in said memory.

5. A terminal according to claim 1, wherein the means related to the transmission and reception of a message have been arranged so that operations required in call mode are performed in said computer, and operations required in idle mode are performed in said radio module.

6. A terminal according to claim 5, wherein for reducing power consumption of the terminal, a processor of the computer has been arranged to transfer, during idle mode, the routine operations required to maintain a network connection to be handled entirely by a processor of the radio module, in which case the computer is arranged to enter a power save mode.

7. A terminal according to claim 1, wherein the radio module comprises radio frequency elements, which include said transmitter, said receiver, a synthesizer and a duplex filter.

8. A terminal according to claim 1, wherein the radio module contains at least one processing means for modifying messages to make them suitable for transfer via radio communication.

9. A method for coupling a terminal to a telecommunications network via radio communication, said terminal comprising a computer and a radio module to be coupled thereto for transmitting and receiving messages with the computer, and in which method the radio module transmits messages with a transmitter and receives messages with a receiver, and where the terminal performs operations related to the transmission and reception of a message, wherein the computer performs part of the operations related to the transmission and reception of a message, and the radio module performs the other part of the operations related to the transmission and reception of a message;

wherein the method further comprises steps of performing, by the computer, at least part of the processing of a baseband signal related to the transmission and reception of the message; and performing, by the radio module, processing of a radio frequency signal.

10. A method according to claim 9, wherein in accordance with a program to be performed in a processor of the computer, a program code retained in a memory located in the radio module is changed for controlling the operations of the radio module.

11. A method according to claim 9, wherein for reducing power consumption of the terminal, the computer transfers, during idle mode, the routine operations required to maintain a network connection to be handled entirely by the radio module, and the computer enters a power save mode.

12. A terminal which comprises a computer and a radio module to be coupled thereto for transmitting and receiving a message, wherein the computer comprises circuitry suitable both for purposes of computing and for telecommunication;

wherein said radio module comprises a transmitter for transmitting the message and a receiver for receiving the message;

said computer circuitry is operable for performing operations related to the transmission and reception of the message;

wherein the computer comprises means, within said computer circuitry, for performing part of the operations related to the transmission and reception of the message, and the radio module comprises means for performing the other part of the operations related to the transmission and reception of the message;

wherein the computer comprises, within said computer circuitry, means for performing part of the processing of a baseband signal related to the transmission and reception of a message, and the radio module comprises means for performing the other part of the processing of a baseband signal related to the transmission and reception of a message and means for performing processing of a radio frequency signal.

13. A terminal which comprises a computer and a radio module to be coupled thereto for transmitting and receiving a message, wherein the computer comprises circuitry suitable both for purposes of computing and for telecommunication;

wherein said radio module comprises a transmitter for transmitting the message and a receiver for receiving the message;

said computer circuitry is operable for performing operations related to the transmission and reception of the message;

wherein the computer comprises, within said computer circuitry, means for performing at least part of the processing of a baseband signal related to the transmission and reception of a message, and the radio module comprises means for performing all of the processing of a radio frequency signal related to the transmission and reception of the message.

14. A terminal according to claim 1, wherein said means for performing the processing of the baseband signal performs all of the processing of the baseband signal.

15. A terminal which comprises a computer and a radio module to be coupled thereto for transmitting and receiving a message by the computer using radio communication, said radio module comprising a transmitter for transmitting a message and a receiver for receiving a message, and said terminal comprising means for performing operations related to the transmission and reception of a message, wherein the computer comprises means for performing part of the operations related to the transmission and reception of a message, and the radio module comprises means for performing the other part of the operations related to the transmission and reception of a message; and wherein the computer comprises means for performing at least part of the processing of a baseband signal related to the transmission and reception of a message, and the radio module comprises means for performing the other part of the processing of a baseband signal related to the transmission and reception of the message and means for performing processing of the radio frequency signal related to the transmission and reception of the message.

* * * * *